(12) United States Patent
Wilmot et al.

(10) Patent No.: US 8,951,619 B2
(45) Date of Patent: Feb. 10, 2015

(54) ELASTOMERIC INSULATION MATERIALS AND THE USE THEREOF IN SUBSEA APPLICATIONS

(75) Inventors: Nathan Wilmot, Missouri City, TX (US); Rajat Duggal, Pearland, TX (US); Harshad M. Shah, Missouri City, TX (US); Alan K. Schrock, Pensacola Beach, FL (US); Juan Carlos Medina, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 197 days.

(21) Appl. No.: 13/819,566

(22) PCT Filed: Aug. 31, 2011

(86) PCT No.: PCT/US2011/049884
§ 371 (c)(1),
(2), (4) Date: Jul. 19, 2013

(87) PCT Pub. No.: WO2012/030906
PCT Pub. Date: Mar. 8, 2012

(65) Prior Publication Data
US 2013/0291992 A1    Nov. 7, 2013

(30) Foreign Application Priority Data
Sep. 1, 2010 (WO) .................. PCT/US2010/04755

(51) Int. Cl.
*B29D 22/00* (2006.01)
*B29D 23/00* (2006.01)
*B32B 1/08* (2006.01)
*C08G 59/18* (2006.01)
*F16L 59/02* (2006.01)
*C09D 163/00* (2006.01)
*B05D 3/10* (2006.01)
*F16L 59/14* (2006.01)

(52) U.S. Cl.
CPC ............... *C08G 59/18* (2013.01); *F16L 59/028* (2013.01); *C09D 163/00* (2013.01); *B05D 3/108* (2013.01); *F16L 59/14* (2013.01); *C08G 59/184* (2013.01)
USPC ....... 428/36.91; 428/36.9; 525/523; 138/145; 427/340

(58) Field of Classification Search
USPC ............... 525/523; 428/36.9, 36.91; 138/145; 427/340
See application file for complete search history.

(56) References Cited

U.S. PATENT DOCUMENTS

| 4,940,770 A | * | 7/1990 | Speranza et al. ............... 528/111 |
| 5,209,871 A | * | 5/1993 | Mason .......................... 252/500 |

* cited by examiner

*Primary Examiner* — Michael C Miggins

(57) ABSTRACT

The invention provides an insulation material comprising an epoxy-terminated prepolymer and an amine curing agent. The reaction production of the epoxy-terminated prepolymer and amine curing agent provides for an elastomer that combines the processing and mechanical properties of polyurethane elastomers with improved thermal-hydrolytic stability. The insulation material is particularly useful as thermal insulation and coating for subsea oil and gas applications.

10 Claims, No Drawings

ELASTOMERIC INSULATION MATERIALS AND THE USE THEREOF IN SUBSEA APPLICATIONS

FIELD OF THE INVENTION

This invention relates to the field of insulated pipelines and structures, and in particular to the field of subsea pipelines and structures and pipelines for use in deep water.

BACKGROUND OF THE INVENTION

Offshore oil drilling requires the conveyance of oil from underwater wellheads to shore or other surface installations for further distribution. The resistance to flow of liquid products such as oil increases as temperature decreases. To avoid a substantial decrease in temperature, the pipelines are generally insulated. Furthermore, the underwater environment exposes equipment to compressive forces, near-freezing water temperatures, possible water absorption, salt water corrosion, undersea currents and marine life.

Polyurethanes are often used for insulating such subsea applications due to general ease of processing (two-component molding) and good mechanical properties (strong and tough elastomer). However, such insulation may suffer from hydrolytic degradation when exposed to hot-wet environments. In fields where the oil temperature is high at the wellhead, there is a possibility of degradation of the polymer network if water were to ingress, which would negatively impact the insulation performance of the materials.

Polypropylene is another kind of material also used to insulate such pipelines, however; this requires a difficult application process, which is the extrusion of several layers, and such insulation generally does not possess the attractive mechanical properties of polyurethane.

Another proposed method of insulating undersea systems is the use of pre-cast sections of rigid epoxy-syntactic foam. This material comprises a rigid epoxy resin mixed with a high volumetric proportion of hollow glass or ceramic spheres. Although this material exhibits excellent thermal conductivity, it is very brittle. Due to the rigidity and brittleness of this material, it is easily damaged when subjected to sudden impacts or high stress levels. To compound this problem, rigid epoxy-syntactic foams are difficult to repair. Removal or replacement of this material is extremely difficult because the sections are bonded to the surface using adhesives or mechanical fasteners.

With the continuing focus on offshore drilling, there continues to be a need for improvements in the materials for insulating the pipelines and associated equipment.

SUMMARY OF THE INVENTION

This invention provides an amine cured epoxy elastomeric material that combines the processing and mechanical properties of polyurethane elastomers with improved thermal-hydrolytic stability. In one embodiment the elastomer is utilized to thermally insulate any object from a surrounding fluid. In a further embodiment the elastomer is used to insulate undersea pipes and well head equipment from seawater.

In a another embodiment the invention provides a method of thermally insulating an object from a surrounding fluid, the method comprising interposing the insulation material between the object and the fluid wherein the insulating material comprises the reaction product of (a) an ambient temperature liquid epoxy-terminated prepolymer formed by reacting one or more polyether-polyamines having a molecular weight of from 3000 to 20,000 with a molar excess of epoxide, wherein the polyether-polyamine has at least 3 active hydrogens and (b) a curing agent comprising at least one amine or polyamine having an equivalent weight of less than 200 and having 2 to 5 active hydrogen atoms.

In a further embodiment the insulating material is a syntactic elastomer containing glass bubbles produced by the reaction of the epoxy terminated prepolymer and an amine curing agent as described above in the presence of the glass bubbles.

In a further embodiment the object insulating material encompasses a pipe.

In another embodiment the object is a subsea Christmas tree.

In further embodiments the present invention provides pipes, subsea Christmas tree, manifold or riser at least partially encased by the insulating material disclosed above.

This invention also provides elastomeric, amine cured epoxy materials that have good low temperature flexibility.

DESCRIPTION OF EMBODIMENTS OF THE INVENTION

The present inventions relates to elastomeric materials and glass syntactic elastomers. The elastomeric materials can be used to thermally insulate any object for a surrounding fluid. In particular, such elastomers are suitable for insulation of substrates, such as oil pipelines in cold water and for insulating wellhead equipment. The elastomeric materials of the present invention may also be used for insulting manifolds, risers, field joints, configurations designated Christmas trees, jumpers, spool pieces and other related sub-sea architectures. The elastomer materials may also be used to coat robotic parts, devices and vehicles used in sub-sea applications. In particular, such elastomeric materials are prepared from by amine curing of an epoxy-terminated prepolymer. While the elastomers are well suited for objects which are submerged in water, the elastomers may be used to coat objects which are not exposed to an aqueous environment.

The elastomer resins are synthesized in at least two steps: first an epoxy-terminated prepolymer is formed and in the second step, the prepolymer is cured by an amine to form the final epoxy-based elastomer. For ease of manufacturing the final product, it is desirable the prepolymer formed is a liquid at ambient conditions to promote flow especially when filling complex molds. In a further embodiment, it is desirable that both the epoxy-terminated prepolymer and amine curing agent are liquid at ambient temperature. Based on the use of an amine-terminated polyether polyol in the formation of the epoxy prepolymer, followed by curing with an amine, the final elastomer contains "soft" structural segments, provided by the polyether. The epoxy portion, when reacted with suitable short polyfunctional amines, provides "hard" structural elements recurring along the ultimate elastomeric polymer chain.

The epoxy-based elastomer, not including any filler, will generally display a percent elongation of greater than 50. In further embodiments the epoxy-based elastomer will have an elongation of at least 60, 70 or 80 percent. When a monoamine curing agent, such as an alkanolamine curing agent is used, the elongation will generally be greater than 100%. In further embodiments the epoxy-based elastomer will have an elongation of at least 110 and in further embodiments 120% or greater In a further embodiment, the presence of the soft and hard segments provide for an epoxy-based elastomer having at least two distinct Tg with one Tg being less than 0° C. The term "Tg" is used to mean the glass transition temperature and is measured via Differential Scanning Calorimetry (DSC). In a further embodiment, the epoxy-based elastomer will have at least one Tg of less than −15° C., −20° C., −30° C., or less than −40° C. In a further embodiment, the epoxy-based elastomer will have at least on Tg of less than −20° C. and at least one onset Tg of greater than 15° C. In a further embodiment, the onset Tg will be greater than 25° C.

Furthermore, the epoxy-based coatings of the present invention may be used for coating pipes or other sub-sea structures where the temperature of transported material may range up to 140° C., even up to 150° C.

The epoxy-based elastomers of the present invention, without the addition of fillers, have a thermal conductivity of less than 0.18 W/m*K, as determined by ASTM C518. In a further embodiment, the elastomers of the present invention have a thermal conductivity of less than 0.16 W/m*K. The thermal conductivity may be further reduced with the addition of hollow spheres, such as glass bubbles.

It was unexpected an epoxy-based elastomer would display the flexibility needed for such sub-sea applications, have good hydrolytic stability, display a good cure profile, and have good insulation properties (low thermal conductivity).

In the present invention, the epoxy-terminated prepolymer is formed by the reaction of a polyoxyalkyleneamine with an epoxy resin. The polyoxyalkyleneamine may also be referred to as an amine terminated polyether polyol. Generally the polyoxyalkyleneamine will have an average molecular weight of at least 3,000. Generally the polyoxyalkyleneamine will have an average molecular weight of less than 20,000. In a further embodiment the polyoxyalkyleneamine will have a molecular weight of at least 3,500. The polyether polyols for producing the polyoxyalkyleneamine are generally obtained by addition of a $C_2$ to $C_8$ alkylene oxide to an initiator having a nominal functionality of 2 to 6, that is, having 2 to 6 active hydrogen atoms. In further embodiments, the alkylene oxide will contain 2 to 4 carbon atoms such as ethylene oxide, propylene oxide, butylene oxide and mixtures thereof. When two or more oxides are used, they may be present as random mixtures or as blocks of one or the other polyether. In a preferred embodiment the polyether polyol will be liquid at room temperatures. In a further embodiment the ethylene oxide content of the polyether polyol will be less than 30, less than 25, less than 20 or less than 15 weight percent ethylene oxide. In one embodiment the polyether polyol is a poly (oxypropylene) polyol. Catalysis for polymerization of alkylene oxide to an initiator can be either anionic or cationic. Commonly used catalysts for polymerization of alkylene oxides include KOH, CsOH, boron trifluoride, a double cyanide complex (DMC) catalyst such as zinc hexacyanocobaltate or quaternary phosphazenium compound.

Examples of commonly used initiators include glycerol, trimethylol propane, sucrose, sorbitol, pentaerythritol, ethylene diamine and aminoalcohols, such as, ethanolamine, diethanolamine, and triethanolamine. In a further embodiment the initiator for the polyether contains from 3 to 4 active hydrogen atoms. In a further embodiment, the initiator is a polyhydric initiator.

The polyols will have an equivalent weight of at least about 500 and preferably at least about 750 up to about 1,500 or up to about 2,000. In one embodiment, polyether polyols having a molecular weight of 4,000 and above, based on trihydric initiators.

The conversion of the polyether to a polyoxyalkyleneamine can be done by methods known in the art. For example by reductive amination, as described, for example in U.S. Pat. No. 3,654,370, the contents of which are incorporated by reference.

The polyoxyalkyleneamines may be represented by the general formula

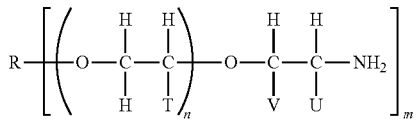

wherein R is the nucleus of an oxyalkylation-susceptible initiator containing 2-12 carbon atoms and 2 to 8 active hydrogen groups, U is an alkyl group containing 1-4 carbon atoms, T and V are independently hydrogen or U, n is number selected to provide a polyol having a molecular weight of as described above and m is an integer of 2 to 8 corresponding to the number of active hydrogen groups originally present in the initiator. In one embodiment, n will have a value of 35 to 100. In a further embodiment R has 2 to 6 or 2 to 4 active hydrogen groups. In another embodiment, the active hydrogen groups are hydroxyl groups. In another embodiment, R is an aliphatic polyhydric initiator. In a further embodiment, R has 3 active hydrogen groups. In further embodiments, n will be less than 90, less than 80, less than 75, or less than 65. In a further embodiment U, T and V are each methyl. Based on the molecular weight of the polyol, the polyoxyalkyleneamine will generally have an amine equivalent weight of from about 900 to about 4,000. In a further embodiment the amine equivalent weight will be less than 3,000. In the practice of this invention, a single molecular weight polyoxyalkyleneamine may be used. Also, mixtures of different polyoxyalkyleneamines, such as mixtures of tri- and higher functional materials and/or different molecular weight or different chemical composition materials, may be used.

Examples of polyoxyalkyleneamine commercially available, are for examples; JEFFAMINE™ D-4000 and JEFFAMINE™ T-5000 form Huntsman Corporation.

The epoxy resins used in producing the epoxy terminated prepolymers are compounds containing at least one vicinal epoxy group. The epoxy resin may be saturated or unsaturated, aliphatic, cycloaliphatic, aromatic or heterocyclic and may be substituted. The epoxy resin may also be monomeric or polymeric.

In one embodiment, the epoxy resin component is a polyepoxide. Polyepoxide as used herein refers to a compound or mixture of compounds wherein at least one of the compounds contains more than one epoxy moiety. Polyepoxide as used herein also includes advanced or partially advanced epoxy resins that is, the reaction of a polyepoxide and a chain extender, wherein the resulting epoxy reaction product has, on average, more than one unreacted epoxide unit per molecule. The epoxy resin component may be a solid or liquid at ambient temperature (10° C. and above). Generally, a "solid epoxy resin" or "SER" is an epoxy-functional resin that has a Tg generally greater than about 30° C. While the epoxy resin may be a solid, the final epoxy terminated prepolymer will be a liquid at ambient temperature. For ease of handling, in one embodiment the epoxy resin is a liquid at ambient temperatures.

In one embodiment the epoxy resin may be represented by the formula

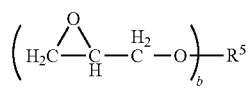

wherein $R^5$ is C6 to C18 substituted or unsubstituted aromatic, a C1 to C8 alphatic, or cycloaliphatic; or heterocyclic polyvalent group and b has an average value of from 1 to less than about 8.

Aliphatic polyepoxides may be prepared from the known reaction of epihalohydrins and polyglycols. Examples of aliphatic epoxides include trimethylpropane epoxide, and diglycidyl-1,2-cyclohexane dicarboxylate.

Other epoxies which can be employed herein include, epoxy resins such as, for example, the glycidyl ethers of polyhydric phenols or epoxy resins prepared from an epihalohydrin and a phenol or phenol type compound.

The phenol type compound includes compounds having an average of more than one aromatic hydroxyl group per molecule. Examples of phenol type compounds include dihydroxy phenols, biphenols, bisphenols, halogenated biphenols, halogenated bisphenols, hydrogenated bisphenols, alkylated biphenols, alkylated bisphenols, trisphenols, phenol-aldehyde resins, novolac resins (i.e. the reaction product of phenols and simple aldehydes, preferably formaldehyde), halogenated phenol-aldehyde novolac resins, substituted phenol-aldehyde novolac resins, phenol-hydrocarbon resins, substituted phenol-hydrocarbon resins, phenol-hydroxybenzaldehyde resins, alkylated phenol-hydroxybenzaldehyde resins, hydrocarbon-phenol resins, hydrocarbon-halogenated phenol resins, hydrocarbon-alkylated phenol resins, or combinations thereof.

Examples of bisphenol A based epoxy resins useful in the present invention include commercially available resins such as D.E.R.™ 300 series and D.E.R.™ 600 series, commercially available from The Dow Chemical Company. Examples of epoxy novolac resins useful in the present invention include commercially available resins such as D.E.N.™ 400 series, commercially available from The Dow Chemical Company.

In a further embodiment, the epoxy resin compounds may be a resin from an epihalohydrin and resorcinol, catechol, hydroquinone, biphenol, bisphenol A, bisphenol AP (1,1-bis (4-hydroxyphenyl)-1-phenyl ethane), bisphenol F, bisphenol K, bisphenol S, tetrabromobisphenol A, phenol-formaldehyde novolac resins, alkyl substituted phenol-formaldehyde resins, phenol- hydroxybenzaldehyde resins, cresol-hydroxybenzaldehyde resins, dicyclopentadiene-phenol resins, dicyclopentadiene-substituted phenol resins, tetramethylbiphenol, tetramethyl-tetrabromobiphenol, tetramethyltribromobiphenol, tetrachlorobisphenol A, or combinations thereof.

In another embodiment, the epoxy resin includes those resins produced from an epihalohydrin and an amine. Suitable amines include diaminodiphenylmethane, aminophenol, xylene diamine, anilines, and the like, or combinations thereof.

In another embodiment, include those resins produced from an epihalohydrin and a carboxylic acid. Suitable carboxylic acids include phthalic acid, isophthalic acid, terephthalic acid, tetrahydro- and/or hexahydrophthalic acid, endomethylenetetrahydrophthalic acid, isophthalic acid, methylhexahydrophthalic acid, and the like or combinations thereof.

Other useful epoxide compounds which can be used in the practice of the present invention are cycloaliphatic epoxides.

A cycloaliphatic epoxide consists of a saturated carbon ring having an epoxy oxygen bonded to two vicinal atoms in the carbon ring for example as illustrated by the following general formula:

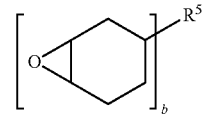

wherein $R^5$ and b are as defined above.

The cycloaliphatic epoxide may be a monoepoxide, a diepoxide, a polyepoxide, or a mixture of those. For example, any of the cycloaliphatic epoxide described in U.S. Pat. No. 3,686,359, incorporated herein by reference, may be used in the present invention. As an illustration, the cycloaliphatic epoxides that may be used in the present invention include, for example, (3,4-epoxycyclohexyl-methyl)-3,4-epoxy-cyclohexane carboxylate, bis-(3,4-epoxycyclohexyl)adipate, vinylcyclohexene monoxide and mixtures thereof.

Another class of epoxy resins useful in the present invention are based on divinylarene oxide product prepared by the process of the present invention may be illustrated generally by general chemical Structures I-IV as follows

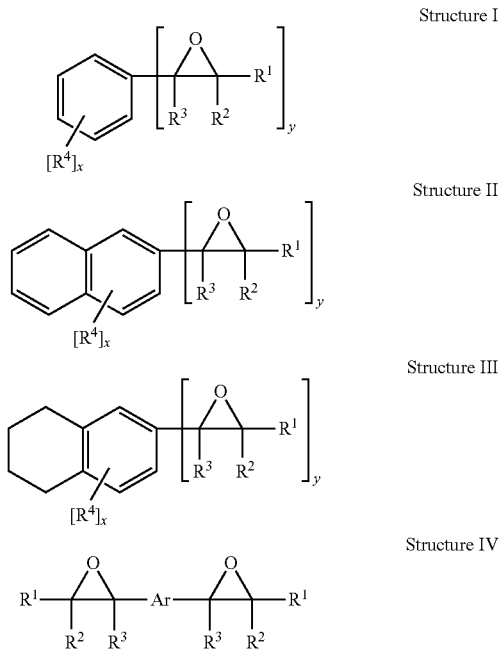

In the above Structures I, II, III and IV of the divinylarene dioxide product of the present invention, each $R^1$, $R^2$, $R^3$ and $R^4$ individually may be hydrogen, an alkyl, cycloalkyl, an aryl or an aralkyl group; or a oxidant-resistant group including for example a halogen, a nitro, an isocyanate, or an RO group, wherein R may be an alkyl, aryl or ar alkyl; x may be an integer of 0 to 4; y may be an integer greater than or equal to 2; x+y may be an integer less than or equal to 6; z may be an integer of 0 to 6; and z+y may be an integer less than or equal to 8; and Ar is an arene fragment including for example, 1,3-phenylene group.

In certain embodiments of the divinylaren dioxide products the alkyl moiety will have from 1 to 36 carbon atoms. In further embodiments the alkyl will have less than 24, or less than 18 carbon atoms. In further embodiments the alkyl will have from 1 to 8 or from 1 to 6 carbon atoms. Similarly the cycloalkyl will contain from 5 to 36 carbon atoms. Generally the cycloalkyl will contain from 5 to 24 carbon atoms.

The aryl moiety present in the divinylarene dioxide will generally contain 12 carbon atoms or less. An aralkyl group will generally contain 6 to 20 carbon atoms.

The divinylarene dioxide product produced by the process of the present invention may include for example alkyl-vinyl-arene monoxides depending on the presence of alkylvinylarene in the starting material.

In one embodiment of the present invention, the divinylarene dioxide produced by the process of the present invention may include for example divinylbenzene dioxide, divinylnaphthalene dioxide, divinylbiphenyl dioxide, divinyldiphenylether dioxide, and mixtures thereof.

Optionally, the epoxy resin may also contain a halogenated or halogen-containing epoxy resin compound. Halogen-containing epoxy resins are compounds containing at least one vicinal epoxy group and at least one halogen. The halogen can be, for example, chlorine or bromine, and is preferably bromine. Examples of halogen-containing epoxy resins useful in the present invention include diglycidyl ether of tetrabromobisphenol A and derivatives thereof. Examples of the epoxy resin useful in the present invention include commercially available resins such as D.E.R.™ 500 series, commercially available from The Dow Chemical Company.

In general, the epoxy resin has a number average molecular weight of less than 20,000, preferably less than 10,000, and more preferably less than 8,000. Generally, the epoxy resins useful in the present invention have an average molecular weight of from about 200 to about 10,000, preferably from about 200 to about 5,000, and more preferably from about 200 to about 1,000.

The epoxide equivalent weight of the epoxy resins is generally from about 100 to about 8000 and more preferably from about 100 to about 4000. As used herein the terms "epoxide equivalent weight" ("EEW") refers to the average molecular weight of the polyepoxide molecule divided by the average number of oxirane groups present in the molecule. The diepoxides useful in the present invention are the epoxy resins having an epoxy equivalent weight of from about 100 to about 500.

The relative amount of epoxy resin employed to make the prepolymer can be varied over wide ranges. Generally the epoxy resin used should be at present in a ratio of at least 3 epoxy groups per amino hydrogen atoms to avoid prepolymer gelling. In further embodiments the ratio of oxirane moieties per amine hydrogen is at least 5, at least 10 and generally up to 20 to 1. In one embodiment, the prepolymer is formed by reacting no less than 4 moles of polyepoxide resin per mole of diamine at temperatures in the range of about 80° C. for not less than 1 hour with constant stirring. Exact temperatures and duration depend on the reactivity of the polyepoxide resins being utilized.

The conditions for reaction of the epoxy resin with the polyoxyalkyleneamine are well known in the art. Generally, when using a polyoxyalkyleneamine and epoxy resin which a liquid at ambient temperatures, no solvent is needed. To promote the reaction, the mixture of polyoxyalkyleneamine and epoxy resin is heated to between 70 to 150° C. for sufficient time to react all of the reactive hydrogen atoms available. Optionally the reaction may be carried out in the presence of catalysts that promote the reaction between amines and epoxides. Optionally the reaction may be carried out in the presence of solvents suitable for dissolving the amine and/or epoxy.

In one embodiment, the final epoxy-terminated prepolymer will be a liquid at ambient temperature, that is, generally a liquid at 15° C. and above. In a further embodiment, the epoxy-terminated prepolymer will be a liquid at 10° C. and above. By liquid, it is inferred that the material is pourable or pumpable.

In the second step of making the epoxy based elastomer of the present invention, the epoxy prepolymer is reacted with an amine terminated curing agent. The amine curing agent is a monoamine or a polyamine having an equivalent weight of less than 200 and having 2 to 5 active hydrogen atoms. Generally the amine curing agent will have an equivalent weight of at least 20. The amino equivalent weight means the molecular weight of the curing agent divided by the number of amine active hydrogen atoms. In a further embodiment, the amine or polyamine has from 2 to 4 active hydrogen atoms. In yet another embodiment, the amine curing agent has 2 amino active hydrogen atoms.

The curing of the elastomer is generally done at a temperature higher than ambient temperature. At is it generally desirable to have a short curing time when making articles, the amine curing agent is selected to give a curing time (demold) of less than 30 minutes when the molds are heated at approximately 100° C. In a further embodiment, the curing time is less than 20 minutes. In a further embodiment the curing time is less than 15 minutes. The amine curing agent is generally added to provide 0.8 to 1.5 amine equivalents (NH) per epoxy reactive group. In a further embodiment the ratio is from 0.9 to 1.1.

Examples of suitable amine curing agents for use in the present invention include those represented by the following formula:

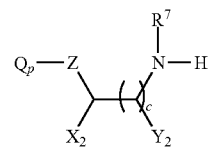

wherein $R^7$, Q, X, and Y at each occurrence are independently H, C1-C14 aliphatic, C3-C10 cycloaliphatic, or C6-C14 aromatic or X and Y can link to form a cyclic structure;

Z is O, C, S, N, or P; and c is 1 to 8: p is 1 to 3 depending on the valence of Z In one embodiment Z is oxygen. In a further embodiment Z is oxygen and $R^7$ is hydrogen. In another embodiment X and Y are both hydrogen.

Cyclic diamine as represented by the following formula may also be used a curing agents in the present invention:

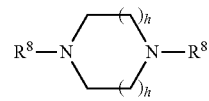

Wherein $R^8$ at each occurrence is independently H or —CH2CH2NH2 and h is 0-2 with the proviso that both h's cannot be 0.

Aromatic amine curing agents may also be used such as toluene-2,4-diamine; toluene-2,6-diamine, isomers of phenylene diamine; aniline; and the like.

In another embodiment the amine curing agent can be the steric and geometric isomers of isophorone diamine, cyclohexane-diyldimethanamine, or cyclohexane diamine.

Examples of specific amine-terminated curing agents include: monoethanolamine; 1-amino-2-propanol; 1-amino-3-propanol; 1-amino-2-butanol; 2-amino-1-butanol; isophorone diamine; piperazine; homopiperazine; butylamine; ethylene diamine; hexamethylene diamine; and mixtures thereof. In one embodiment the amine curing agent is an alkanolamine.

In a further embodiment, amine terminated polyethers having an equivalent weight of less than 200, such as JEFFAMINE™ D-400 from Huntsman Chemical Company.

In certain embodiments, the curing may contain a combination of an aliphatic and an aromatic curing agent to have a staged curing process. The combination of amine curing agents allows a first curing step, generally done at 70 to 80° C. whereby the aliphatic amine reacts with the epoxy moiety to form a prepreg, and a second curing step done at temperatures above 80° C. for curing with the aromatic amine.

If desired, the thermal conductivity of the epoxy material can be decreased by the addition of fillers. Suitable fillers include glass hollow spheres, hollow thermoplastic spheres composed of acrylic type resins such as polymethylmethacrylate, acrylic modified styrene, polyvinylidene chloride or copolymer of styrene and methyl methacrylate; phenolic resins; silica, ceramic or carbon spheres. Preferred fillers are hollow microspheres. The term "hollow" with respect to the hollow objects for use in the present invention is to be understood as at least 50% of the enclosed volume being filled with gaseous fluid. Optionally the enclosed volume being only filled with gaseous fluid. Such filled systems are generally referred to as syntactic materials.

Examples of hollow glass microspheres include, for example, Scotchlite™ GlassBubbles from 3M, hollow polymer microspheres, for example Expancel™ from Akzo Noble, or hollow ceramic microsphers, for example Cenospheres™ from Sphere Services Inc.

Generally the hollow microspheres provide less than 35 wt %, or less than 25wt %, of the syntactic coating. In one embodiment, hollow glass beads provide 5 to 15 wt % of the syntactic coating, the percentage by weight (wt %) being relative to the whole formulation.

Generally the microspheres are will be blended with the epoxy-terminated prepolymer by techniques known in the art. If desired, viscosity modifying agents known in the art may be added. Examples of such additives include diglycidyl ether of butane diol, glycidyl ethers of fatty acid or natural oils or TEP (tri ethyl phosphate, $(C_2H_5)_3PO_4$). If desired, other additives which may be used with the elastomers of the present invention include flame retarding agents, plasticizers, antioxidants, UV stabilizers, adhesion promoters, dyes, pigments, fillers other than glass bubbles, and reinforcing agents.

As previously mentioned, the epoxy-based elastomeric material of the present invention may be used in the insulation of any object from a surrounding fluid. In particular the elastomer materials are used for insulating oil and gas flowlines, manifolds, risers, field joints, configurations designated Christmas trees, jumpers, spool pieces and other related subsea architecture. The pipe that is coated with the elastomeric material can have any outer diameter, inner diameter and length. Generally the outer diameter is at least 10 cm and the length of 1 meter or more.

Subsea Christmas tree structures are well known in the industry and as described, for example, in U.S. Pat. Nos. 6,520,261 and 6,746,761; the portions of such documents disclosing such structures being incorporated herein by reference. In general such structures will include a production bore in communication with the well bore, a production outlet connected to the production bore a flow loop in communication with the production outlet. The structures may include other typical components such as one or more production valves for controlling flow through the production outlet. Typically the insulation material is applied to those portions of the christmas tree which are most exposed to the surrounding seawater and through which the produced fluids will flow.

In another aspect of the present invention, a process for providing an epoxy based material coating for offshore applications is provided. The process comprises the steps of
providing a surface to be coated;
providing an epoxy terminated prepolymer;
providing an amine terminated curing agent;
bringing the epoxy terminate prepolymer and amine terminated curing agent and optionally hollow objects, into contact with said surface and reacting said epoxy terminated prepolymer and amine terminated curing agent thereby providing an epoxy based coating.

The application of the reaction mixture to the surface to be coated is carried out by methods known in the art. Examples are rotation casting, casting in molds and the mixing pot process. See, for example, publications WO 02/072701; WO 2009/085191 and U.S. Pat. No. 6,955,778.

When the surface to be coated is a metal pipe, such as a steel pipe, the pipe may be coated with a material to provide an anticorrosion layer or adhesion promoting layer prior to addition of the elastomer of the present invention. Examples of protective layers commonly used in the industry include a partially or fully cured fusion bonded epoxy or liquid epoxy primers with a glass transition temperature range between 70 to 200° C. When used, the epoxy primer is generally overlaid with the elastomer of the present invention. The elastomers may also comprise one layer of a multi-layered coating for such pipes. For example, the elastomer may be overlaid with an additional layer of material, such as paint, a silicone, polyurethane, epoxy, or polyolefin.

When the epoxy-based elastomeric material is applied to a complex structures, such a christmas tree using a variety of methods known in the art for application may be used. In one method, a form or mold is constructed around the object to be insulated. The epoxy-terminated prepolymer/amine curing additive/optional additive and thoroughly mixed and then cast between the object and the mold and allowed to cure. Once the material has cured, the mold is removed. Alternatively, the insulation material can be pre-cast into sections which are shaped to complement the object to be insulated. Once the pre-cast sections have cured, they may be secured to the object using adhesives, mechanical fasteners, or any other suitable means. The insulation material can also be sprayed on the object.

In the rotation casting process for coating objects such as pipes, after thoroughly mixing the epoxy-terminated prepolymer, amine curing additive and optional additive(s), the mixture is poured by means of a film nozzle onto a pipe which is rotating about its axis and the desired coating thickness is set via the speed at which the nozzle is advanced. In casting in a mold, a pretreated section of pipe is laid in a heated mold, which generally has been treated with mold release agents, the mold is closed, inclined and filled from the lowest point via a hose until the reacting mixture comes out of the mold at the highest point. When heating, the mold is generally heated to between 80° C. and 120° C. In the mixing pot process, a reacting system metering machine is introduced into a mixing pot which is open at the bottom. At the same time, a defined amount of hollow microspheres is metered in by means of a screw metering device. The reaction mixture can be applied to a rotating pipe or introduced into a mold via an outlet orifice.

The coating provided may have a thickness in the range up to 100 mm, typically in the range of 10 to 50 mm. In a further embodiment the coating will have a density of more than 0.5 g/cm$^3$.

The following examples are provided to illustrate the invention, but are not intended to limit the scope thereof. All parts and percentages are by weight unless otherwise indicated.

EXAMPLES

Example 1

Production of Epoxy Terminated Prepolymer

A 20 gallon stainless steel reactor is charged with 49.6 kg of DER™ 383 liquid epoxy resin, a reaction product of epichlorohydrin and bisphenol A, available from The Dow Chemical Company (epoxy equivalent weight=180.1 g/mol) with agitation followed by addition of 52.3 kg of Jeffamine™ T5000 polyoxyalkyleneamine, a polyoxypropylene triamine with a nominal molar mass of 5000 g/mol available from Huntsman Corp. (amine equivalent weight=952 g/mol). The vessel is degassed, padded with nitrogen and the temperature slowly increased to 125° C. via a heated jacket. The internal temperature is maintained at 120° C. and held for three hours. The vessel is then cooled to 80° C., the agitator stopped and the sample discharged. The epoxy terminated prepolymer is found to be a viscous liquid at 25° C. (approximately 90,000 cPs) with a measurable epoxy equivalent weight of 412 g/mol (463 actual).

Examples 2 to 5

Elastomer Preparation

The epoxy terminated prepolymer prepared in Example 1, is added to lidded cups suitable for use in a FlackTek Speed-Mixer™ and the sample mixed for 30 seconds at 800 rpm, then mixed at 2350 rpm for 1 minute to remove bubbles and then heated in a 54° C. oven. Then amine curing agent is added according to the formulations in the Table 1, the values are in parts by weight.

TABLE 1

| | 2 | 3 | 4 | 5 | 6 | C1* |
|---|---|---|---|---|---|---|
| Epoxy Prepolymer from Example 1 | 100 | 100 | 100 | 100 | 100 | 100 |
| monoethanolamine | 6.6 | | | | 5.0 | |
| 1-amino-2-propanol | | 8.1 | | | | |
| 1-amino-3-propanol | | | 8.1 | | | |
| 2-amino-1-butanol | | | | 9.6 | | |
| Triethylene tetramine | | | | | 1.0 | 5.2 |

*Example C1 is a comparative.

After addition of the curing agent, the samples are mixed on a FlackTek SpeedMixer for 30 seconds at 800 rpm followed by 2350 rpm for 1 minute. The mixtures are then poured into closed aluminum molds that are preheated to 100° C. and treated with a mold release agent. The molds are placed back into the 100° C. oven and allowed to cure for approximately 1 hour, demolded and cooled to room temperature for 24 hours. Tensile properties are then measured according to ASTM D1708 and thermal properties are measured via Differential Scanning calorimetry by cutting approximately 10 mg samples and placing the samples in aluminum pans. The DSC procedure is to cool the samples to −90° C. then ramp to 200° C. at a rate of 10° C./min. The thermal cycle is repeated and the onset of glass transition temperatures is measured on the second upward scan. The measured properties of the produced elastomers are given in Table 2.

TABLE 2

| | Tensile Strength (MPa) | Elongation at Break (%) | Stress at 100% Strain (MPa) | Shore A Hardness | Tg1 (° C.) | Tg2 (° C.) |
|---|---|---|---|---|---|---|
| Example 2 | 7.60 | 160 | 4.3 | 76 | −55 | 73 |
| Example 3 | 11.70 | 250 | 7 | 92 | −55 | 37 |
| Example 4 | 7.70 | 200 | 3.5 | 76 | −55 | 59 |
| Example 5 | 5.9 | 600 | 1 | 81 | −55 | 17 |
| Example 6 | 9.5 | 117 | 8.3 | 85 | −55 | 5 |
| Example C1 | 7.3 | 60 | N/A | 88 | −55 | None detected |

The results show the use high functional curing agent (triethylene tetramine) as the sole curing agent, has a deleterious effect on the properties of the produced elastomers.

Examples 7 and 8

The epoxy terminated prepolymer prepared in Example 1, is added to lidded cups suitable for use in a FlackTek Speed-Mixer and the sample mixed for 30 seconds at 800 rpm, then mixed at 2350 rpm for 1 minute to remove bubbles and then heated in a 54° C. oven. Then amine curing agent and DMP 30 (2,4,6-tris(dimethylaminomethyl)phenol) as catalyst were added according to the formulations in the Table 3.

TABLE 3

| | 7 | 8 |
|---|---|---|
| Epoxy Prepolymer from Example 1 | 100 | 100 |
| monoethanolamine | 6.6 | |
| 1-amino-2-propanol | | 8.1 |
| DMP 30 | 3.2 | 3.2 |

After addition of the curing agent and catalyst, the samples are Speedmixed for 30 seconds at 800 rpm followed by 2350 rpm for 1 minute. The mixtures are then poured into closed, vertical molds that are preheated to 100° C. treated with a mold release agent. The molds are placed back into the 100° C. oven, allowed to cure for 12 minutes then demolded and cooled to room temperature for 24 hours. Tensile properties and DSC measurements are done as described above.

TABLE 4

| | Tensile Strength (MPa) | Elongation at Break (%) | Shore A Hardness | Tg1 (° C.) | Tg2 (° C.) |
|---|---|---|---|---|---|
| Example 7 | 12.1 | 160 | 83-87 | −55 | 85 |
| Example 8 | 15.4 | 210 | 93-97 | −55 | 61 |

The results show the addition of the catalyst generally improves the strength and hardness properties of the elastomers without increasing the primary glass transition temperature. In addition the thermal conductivity of examples 7 and 8 are measured according to ASTM and is measured as were found to be 0.160 W/m*K and 0.155 W/m*K respectively.

Example 9

Thermo-Oxidative Testing of Elastomers According to ASTM D2000

Elastomers produced according the procedure of Example 2 are tested for thermo-oxidative stability. Microtensile dogbone samples suitable for testing via ASTM D1708 are cut from the sample and these specimens were aged in an air-forced oven for 70 hours at temperatures of 70, 100, 125, and 150° C. The samples are allowed to cool to room temperature and stand for a minimum of 24 hours before microtensile testing. The tensile properties of the fresh and aged samples and are reported in Table 5. The values are -the average of 4 tensile specimens.

TABLE 5

|  | Tensile Strength (MPa) | Elongation at Break (%) | Stress at 100% Strain (MPa) | Shore A Hardness |
|---|---|---|---|---|
| Unaged | 7.9 | 165 | 4.3 | 77-78 |
| 70° C. Aged | 7.8 | 148 | 4.8 | 79-80 |
| 100° C. Aged | 9.5 | 169 | 5.0 | 79-81 |
| 125° C. Aged | 9.2 | 184 | 4.3 | 78-79 |
| 150° C. Aged | 9.7 | 241 | 3.1 | 73-74 |

Following the ageing cycle, there is not a significant reduction in the mechanical properties of the produce elastomers indicating good thermo-oxidative stability.

Examples 10 and 11

To test the performance of a syntactic elastomer, example 10 is prepared as per the procedure of example and example 11 follows the procedure of example 2 except Scotchlite S38HS glass bubbles (received from 3M Company) (19 grams) are added to the epoxy terminated prepolymer before the addition of ethanolamine. The glass bubbles are mixed by hand on the FlakTek until a homogeneous dispersion is achieved. Elastomer molding conditions and the demolding time are the same as for the solid elastomer. The properties of the produced elastomers are given in table 6 (average of 4 samples).

TABLE 6

|  | Shore A Hardness | Tensile Strength (MPa) | Elongation at Break (%) |
|---|---|---|---|
| Solid Epoxy | 80 | 8.4 | 170 |
| Syntactic Epoxy | 92 | 5.8 | 63 |

Example 12

Hydrolytic Aging of Epoxy Elastomers

Elastomers produced according to the procedure of Examples 2 and 3 are tested for hydrolytic stability. Microtensile dogbone samples suitable for testing via ASTM D1708 are cut from the sample and these specimens along with several cylindrical specimens with dimensions of approximately 2 inches (5 cm) long with 1 inch (2.54 cm) diameter are aged in deionized water in a one gallon stainless steel pressure chamber at 160° C. for time periods of two and four weeks. Following the aging intervals, specimens are removed, allowed to cool to approximately 25° C., and surface dried. Cylinders are measured for weight change and Shore A hardness and compared to the unaged values. Tensile specimens are tested under two conditions. First, specimens are tested for retention of properties within 2 hours of being removed from the pressure chamber. Separate sets of specimens are post-dried in a 60° C. oven overnight to remove any entrained water, allowed to cool to 25° C., and then tested for tensile properties. Tensile data is reported as the average of 5 specimens at each interval. Mass and hardness changes are reported as the average of 3 cylindrical samples. The results from this testing are given in Table 7.

TABLE 7

|  | Material from Example 2 - Initial | Material from Example 2 - Two Weeks Aged | Material from Example 2 - Four Weeks Aged | Material from Example 3 - Initial | Material from Example 3 - Two Weeks Aged | Material from Example 3 - Four Weeks Aged |
|---|---|---|---|---|---|---|
| %-Mass Change | — | +6.1 | +7.0 | — | +5.5 | +6.2 |
| Shore A Hardness | 78 | 67 | 67 | 90 | 67 | 67 |
| Tensile Strength (MPa) - No Post-dry | 7.3 | 3.3 | 3.3 | 10.9 | 3.9 | 3.2 |
| Elongation at Break (%) - No Post-dry | 130 | 92 | 101 | 210 | 143 | 148 |
| Tensile Strength (MPa) - After Post-dry | 7.3 | 8.5 | 8.7 | 10.9 | 9.4 | 9.3 |
| Elongation at Break (%) - After Post-dry | 130 | 127 | 138 | 210 | 125 | 121 |

The data shows that the materials undergo a change from the initial values to the first aging interval of two weeks but show good stability from two weeks to four weeks for all properties. It is seen from the Example 2 elastomer that the tensile property changes are primarily due to moisture absorption since after the post-drying step the properties return to very near original values. This indicates that the materials have very good resistance to hydrolytic degradation.

Example 13

Coating Preparation

To determine the effectiveness of the elastomers of the present invention as a protective coating, steel plates are coated with the elastomer and property measurements performed as per systems A1/A2 in accordance with the CSA standards (Z245.20-06, *External fusion bond epoxy coating for steel pipe*).

An epoxy terminated prepolymer is prepared per the procedure of Example 1 wherein DER 383 and Jeffamine T5000 are mixed at a 5-to-1 molar ratio. An elastomer is produced as per the procedure of Example 2 by mixing 100 g of the prepolymer with 8.15 g of 2-propanol amine as the amine curing agent. The mixture is then cast into a square mold window sitting on parallel-aligned two steel panels, covered with a non-stick aluminum sheet, and placed in an oven at 120° C. In a maximum of one hour, the coating is demolded and cut into two pieces using a utility knife. The thickness of the final coating ranges between 1.2 mm and 1.5 mm.

Performance Results (a) Impact Test

The coating specimens are placed in a freezer and cooled to −30° C. for a minimum of one hour before testing. The impact test is performed by a falling 1 kg mass on the panel with impact energy of at least 3.0 J per mm of actual coating thickness. Three impacts are completed within 30 sec of removal of the specimen from the freezer. Visual observation of the material coated with the elastomer have an essentially damage free surface, that is, no observed delamination or cracks in the coating surface. It is believed the damage resistance of the elastomers is due to the presence of the soft segments, which are phase separated from the hard segments, with the glass transition temperature lower than −30° C.

For comparison of the impact resistance test, an epoxy coating, based on the formulation given in Table 8, is powder coated onto 3×8 inch (7.6×20.3 cm) steel plates with a thickness of approximately 10 mil.

TABLE 8

Formulation of FBE powder coating

|  | C2 |
|---|---|
| DER 664 UE | 592.4 |
| Amicure CG-1200 (DICY | 8.1 |
| EpiCure P101 | 7.5 |
| Modaflow Powder III | 10.0 |
| Vansil W20 | 382.0 |

DER 664UE is a solid epoxy resin having an EEW of 900 equivalents per gram and commercially available from The Dow Chemical Company; Amicure CG 1200 is a dicyandiamide powder available from Air Products; Epikure 101 is an imidazol based curing agent and is commercially available from Hexion; Modaflow Powder III is a flow modifier and commercially available from Solutia Inc.; Vansil W 20 is a wollastonite extender and is commercially available from R.T. Vanderbilt Company, Inc.

Visual observation of the impact test shows clear impact marks of the falling mass on the FBE coated surface.

(b) Cathodic Disbondment (CD) Test

A 3 0 mm diameter holiday is drilled in the center of the test specimen through the elastomer coating to expose the steel substrate in 3% saline solution under two different corrosion conditions: (a) 3.5 V (negative to the reference) at 65° C. for 48 hours or (b) 1.5 V at 65° C. for 28 days. After 48 hours the elastomer coating showed marginal disbondment from the steel plates; less than 5 mm radius. For the 28 days specimen, a disbondment radius of 5 mm is observed.

(c) Hot Wet Adhesion (HWA) Test

HWA test is carried out by immersing test panels upright in a tap water bath being heated at 75° C. The specimens are removed in 48 hours and 30 mm×15 mm rectangle is scribed through the coating using a utility knife immediately after removal. Using a levering action of the knife, the coating is forced to peel off by inserting the tip of the blade of the knife under the elastomer at each corner of the rectangle. Only marginal delamination is created for the FBE and the elastomer coatings at corners.

(d) Peel Adhesion Test

The test panel is clamped on the horizontal translational stage, which virtually slides friction-free through the linear track in the base frame, and installed in an Instron 4505 test instrument at ambient temperature. A 25 mm width strip of the elastomer coating is peeled from the steel panel perpendicularly from the steel pane at a constant crosshead speed of 10 mm/min. Beyond the yield point, the peel adhesion force reaches a steady state of 95.3 N. The CSA standards require 3.0 N and 19.6 N minimum for systems A1 and A2, respectively.

(e) 2.5° Flexibility Test

The elastomer coatings are applied to 1×8 inch (2.5 cm×20.3 cm) steel bars instead of steel plates for flexibility test. The bars are cooled to −30° C. in the freezer and stored for a minimum of one hour prior to the test. Within 30s of removal, four points on the specimen are subjected to the hydraulic compression to achieve at least 2.5° bending (actual bending of the test bar is)7°. Visual observation indicates the elastomer coatings do not show any sign of adhesive or cohesive failure.

Example 14

To determine the performance of the elastomer in double layer coatings, test specimens are prepared by applying a layer of fusion bonded epoxy (FBE) to the test materials followed by the addition of the elastomeric layer over the FBE. Tests are performed for systems B1/B2 defined in accordance with the CSA standards (Z245.21-06, *External polyethylene coating for pipe*). The conditions for testing of the materials are essentially as per the procedures given in Example 13, with the exception the samples sizes are adjusted according to the CSA standards.

Approximately a 10 mil thick FBE coatings are applied on 3×8 inch (7.6×20.3 cm) steel plates via a powder coating process. Plates with just the FBE layer serve as the controls. The elastomer is produced as per Example 13. The mixture for the elastomer is cast into a square mold window sitting on the parallel-aligned FBE coated panels, covered with a non-stick aluminum sheet, and placed in an oven at 120° C. In a maximum of one hour, the coating is demolded and cut into two pieces using a utility knife. The final elastomer coating thickness ranges from 1.2 mm to 1.5 mm. All Visual observation of the test results is as follow:

Impact Test

The single FBE layer coating is regarded as failing due to clear impact marks of falling mass that exposed the metal beneath the coatings. The FBE/elastomer coatings show a partial mark on the FBE primer, however; no delamination, cracks or dents are observed on the elastomer layer.

Cathodic Disbondment (CD) Test

The 48 hour results show that marginal, less than 5 mm disbondment, occurs in the FBE primer from the steel plate for both FBE and FBE/elastomer coating. A maximum of 7 mm radius disbondment is allowed in the CSA standards.

Hot Wet Adhesion (HWA) Test

Only marginal delamination of the FBE coating is created using the knife action for both FBE and FBE/elastomer coatings.

Peel Adhesion Test

The specimens break before delamination from the FBE primer implying the adhesion force between two layers exceeds the cohesive energy of the elastomer layer. At the yield point, it is consistently observed that the peel adhesion force reaches 200 N before failure, which is greater than a threshold (150.0 N) specified in CSA standards.

2.5° Flexibility Test (4 Point Bending)

The FBE primer protected with the elastomer coating does not reveal any sign of adhesive or cohesive failure while multiple cracks and delamination are created along the bars coated with the single FBE layer.

While the foregoing is directed to embodiments of the invention, other and further embodiments of the invention may be devised without departing from the basic scope thereof.

We claim:

1. A method of thermally insulating an object from a surrounding fluid, the method comprising interposing an insulation material between the object and the fluid wherein the insulating material comprises the reaction product of
   (a) an ambient temperature liquid epoxy-terminated prepolymer formed by reacting one or more polyoxyalkyleneamines having a molecular weight of from 3000 to 20,000 with a molar excess of epoxide, wherein the polyether-polyamine has at least 3 active hydrogens and
   (b) a curing agent comprising at least one amine or polyamine having an equivalent weight of less than 200 and having 2 to 5 active hydrogen atoms.

2. The method of claim 1
wherein the epoxide is at least one cycloaliphatic epoxide of the formula

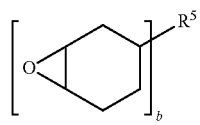

wherein $R^5$ is C6 to C18 substituted or unsubstituted aromatic, a C1 to C8 aliphatic, or cycloaliphatic; or heterocyclic polyvalent group and b has an average value of from 1 to less than about 8.

3. The method of claim 1 wherein the epoxide is at least one divinylarene oxide of the following Structures:

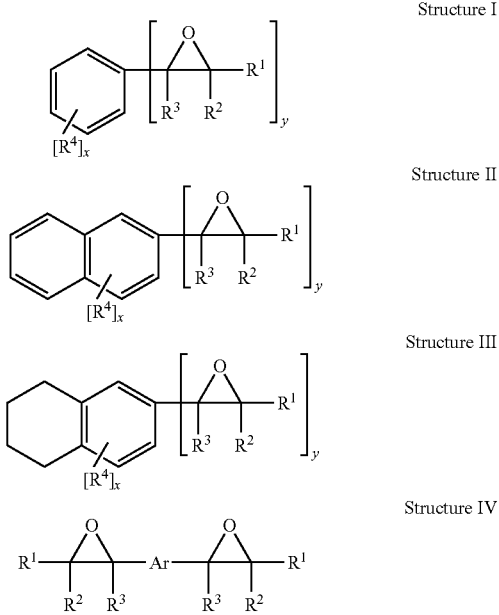

wherein each $R^1$, $R^2$, $R^3$ and $R^4$ is individually hydrogen, an alkyl, cycloalkyl, an aryl or an aralkyl group; or a oxidant-resistant group including for example a halogen, a nitro, an isocyanate, or an RO group, wherein R may be an alkyl, aryl or ar alkyl; x may be an integer of 0 to 4; y may be an integer greater than or equal to 2; x+y may be an integer less than or equal to 6; z may be an integer of 0 to 6; and z+y may be an integer less than or equal to 8; and Ar is an arene fragment including for example, 1,3-phenylene group.

4. The method of claim 1 wherein the polyoxyalkyleneamine is represented by the formula:

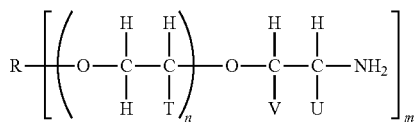

wherein R is the nucleus of an oxyalkylation-susceptible initiator containing 2-12 carbon atoms and 2 to 8 active hydrogen groups, U is an alkyl group containing 1-4 carbon atoms, T and V are independently hydrogen or U, n is number selected to provide a polyol having a molecular weight of 2,900 to 29,500 and m is an integer of 2 to 8 corresponding to the number of active hydrogen.

5. The method of claim 4 wherein U is an alkyl group containing 1 or 2 carbon groups and T and V are independently hydrogen or an alkyl group containing one carbon.

6. The method of claim 1 wherein the epoxide is at least one or more of the formula

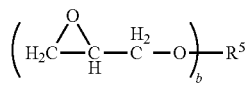

wherein $R^5$ is C6 to C18 substituted or unsubstituted aromatic, a C1 to C8 aliphatic, or cycloaliphatic; or heterocyclic polyvalent group and b has an average value of from 1 to less than about 8.

7. The method of claim 6
wherein the epoxide is one or more of diglycidyl ethers of resorcinol, catechol, hydroquinone, bisphenol, bisphenol A, bisphenol AP (1,1-bis(4-hydroxylphenyl)-1-phenyl ethane), bisphenol F, bisphenol K, bisphenol S, tetrabromobisphenol A, phenol-formaldehyde novolac resins, alkyl substituted phenol-formaldehyde resins, phenol-hydroxybenzaldehyde resins, cresol-hydroxybenzaldehyde resins, dicyclopentadiene-phenol resins, dicyclopentadiene-substituted phenol resins tetramethylbiphenol, tetramethyl-tetrabromobiphenol, tetramethyltribromobiphenol, tetrachlorobisphenol A, or a combination thereof.

8. The method of claim 1 wherein the amine curing agent is present in an amount to provide 0.8 to 1.5 amine equivalents per epoxy reactive group and,
the amine curing agent is at least one curing agent represented by the formula:

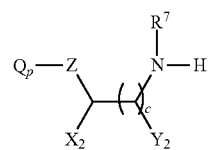

wherein $R^7$, Q, X, and Y at each occurrence are independently H, C1-C14 aliphatic, C3-C10 cycloaliphatic, or C6-C14 aromatic or X and Y can link to form a cyclic structure;
Z is O, C, S, N, or P; and
c is 1 to 8: p is 1 to 3 depending on the valence of Z.

9. The method of claim 8 wherein the amine curing agent is represented by the formula

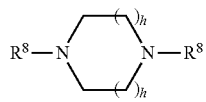

wherein $R^8$ at each occurrence is independently H or —CH2CH2NH2 and h is 0-2 with the proviso that both h's cannot be 0.

10. A pipe at least partially encased by a thermal insulating wherein the insulating layer comprises the reaction product of
   (a) an ambient temperature liquid epoxy-terminated prepolymer formed by reacting one or more polyether-polyamines having a molecular weight of from 3000 to 20,000 with a molar excess of epoxide, wherein the polyether-polyamine has at least 3 active hydrogens and
   (b) a curing agent comprising at least one amine or polyamine having an equivalent weight of less than 200 and having 2 to 5 active hydrogen atoms.

* * * * *